(12) United States Patent
Kondo

(10) Patent No.: US 9,285,797 B2
(45) Date of Patent: Mar. 15, 2016

(54) CHATTER VIBRATION DETECTION METHOD, CHATTER VIBRATION AVOIDANCE METHOD, AND MACHINE TOOL

(75) Inventor: Eiji Kondo, Kagoshima (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 374 days.

(21) Appl. No.: 13/820,996

(22) PCT Filed: Apr. 27, 2011

(86) PCT No.: PCT/JP2011/060679
§ 371 (c)(1),
(2), (4) Date: Mar. 5, 2013

(87) PCT Pub. No.: WO2012/032811
PCT Pub. Date: Mar. 15, 2012

(65) Prior Publication Data
US 2013/0164092 A1    Jun. 27, 2013

(30) Foreign Application Priority Data
Sep. 10, 2010   (JP) .................................. 2010-203276

(51) Int. Cl.
*B23Q 15/08*   (2006.01)
*G05B 19/404*   (2006.01)
*B23Q 17/09*   (2006.01)

(52) U.S. Cl.
CPC .............. *G05B 19/404* (2013.01); *B23Q 15/08* (2013.01); *B23Q 17/0976* (2013.01); *G05B 2219/37434* (2013.01); *G05B 2219/41256* (2013.01); *Y10T 409/303808* (2015.01); *Y10T 409/304704* (2015.01)

(58) Field of Classification Search
None
See application file for complete search history.

(56) References Cited

U.S. PATENT DOCUMENTS

| | | | | |
|---|---|---|---|---|
| 5,170,358 A | * | 12/1992 | Delio | 700/177 |
| 5,784,273 A | * | 7/1998 | Madhavan | 700/71 |
| 2010/0010662 A1 | * | 1/2010 | Inagaki | 700/175 |
| 2010/0034609 A1 | * | 2/2010 | Doppenberg | 409/131 |
| 2010/0104388 A1 | | 4/2010 | Suzuki et al. | |

FOREIGN PATENT DOCUMENTS

| | | |
|---|---|---|
| JP | 63-176049 | 11/1988 |
| JP | 5-200648 | 8/1993 |
| JP | 10-6181 | 1/1998 |
| JP | 2005-74568 | 3/2005 |
| JP | 2008-290164 | 12/2008 |

OTHER PUBLICATIONS

International Search Report mailed Jul. 12, 2011, directed towards PCT Application No. PCT/JP2011/060679; 4 pages.
Extended European Search Report dated Apr. 11, 2014, directed to EP Application No. 11823290.9; 4 pages.

* cited by examiner

*Primary Examiner* — Sean Shechtman
(74) *Attorney, Agent, or Firm* — Morrison & Foerster LLP

(57) ABSTRACT

A chatter vibration detection method includes acquiring vibration data of a tool (4) at a time of machining a workpiece at a predetermined sampling period (Δt), calculating an autocorrelation coefficient (Rxx') corresponding to a time required for a cutting edge (4a, 4b) to contact the workpiece (W) several times based on acquired time series vibration data and calculating a period (Tx) of characteristics of the calculated autocorrelation coefficient (Rxx'), and deciding that chatter vibration occurs when a contact period (T1) at which the cutting edge (4a, 4b) contacts the workpiece (W) is not an integral multiple of the calculated period (Tx).

8 Claims, 8 Drawing Sheets

CHATTER VIBRATION DETECTION METHOD, CHATTER VIBRATION AVOIDANCE METHOD, AND MACHINE TOOL

REFERENCE TO RELATED APPLICATIONS

This application is the national stage application under 35 USC 371 of International Application No. PCT/JP2011/060679, filed Apr. 27, 2011, which claims priority from Japanese Patent Application No. 2010-203276, filed Sep. 10, 2010, the entire contents of which are incorporated herein by reference.

FIELD OF THE INVENTION

The present invention relates to a chatter vibration detection method which detects the chatter vibration which occurs when machining a workpiece, in particular, chatter vibration which is called "regenerative chatter vibration", a chatter vibration avoidance method which avoids the chatter vibration, and a machine tool.

BACKGROUND OF THE INVENTION

In the past, in a machine tool where a tool attached to a rotary spindle is moved relative to a workpiece so as to work the workpiece, a system designed to suppress the chatter vibration which occurs during the machining operation has been known (for example see Patent Literature 1). The system described in this Patent Literature 1 uses an FFT processing unit to perform Fourier analysis of the vibration acceleration, compares each maximum acceleration calculated by the Fourier analysis with a preset reference value, and decides that chatter vibration to be suppressed has occurred when any single maximum acceleration exceeds the reference value.

Japanese Unexamined Patent Publication No. 2008-290164 A1

SUMMARY OF INVENTION

However, the system described in the above Patent Literature 1 uses Fourier analysis to decide the occurrence of chatter vibration, so a large amount of data is necessary. For this reason, for example, a long data sampling time of about 1 second is required and immediate detection and avoidance of the occurrence of chatter vibration during a machining operation are difficult.

The present invention is made to solve this problem. An object of the present invention is to detect chatter vibration in substantially real time and quickly avoid that vibration.

The present invention provides a chatter vibration detection method for detecting chatter vibration, the chatter vibration occurring when a tool having a cutting edge is attached to a rotary spindle and this tool is moved relative to a workpiece to machine the workpiece, including: a data acquiring step of acquiring vibration data, which has a correlation with vibration of the tool at a time of machining the workpiece, at a predetermined sampling period; a calculating step of calculating an autocorrelation function corresponding to a time required for the cutting edge to contact the workpiece several times based on time series vibration data acquired by the data acquiring step, and calculating a period or frequency of characteristics of the calculated autocorrelation function; and a deciding step of deciding that the chatter vibration occurs when a contact period at which the cutting edge contacts the workpiece is not an integral multiple of the period calculated by the calculating step or when the frequency calculated by the calculating step is not an integral multiple of a product of a number of cutting edges of the tool and a rotational speed of the rotary spindle.

Further, a chatter vibration avoidance method according to the present invention includes a rotational speed adjusting step of calculating a phase difference determined from the contact period of the cutting edge and the period calculated by the calculating step or a phase difference determined from the product of the number of cutting edges of the tool and the rotational speed of the rotary spindle and the frequency calculated by the calculating step when the above-mentioned deciding step decides that the chatter vibration occurs, increasing and decreasing the rotational speed of the rotary spindle by a predetermined ratio based on the calculated phase difference, and repeating the increasing and decreasing of the rotational speed of the rotary spindle until the calculated phase difference becomes substantially 0.

Furthermore, the present invention provides a machine tool for machining a workpiece, in which a tool having a cutting edge is attached to a rotary spindle, and this tool is moved relative to the workpiece, including: a data acquiring portion acquiring vibration data, which has a correlation with vibration of the tool at a time of machining the workpiece, at a predetermined sampling period, a calculating portion calculating an autocorrelation function corresponding to a time required for the cutting edge to contact the workpiece several times based on time series vibration data acquired by the data acquiring portion, and calculating a period or frequency of characteristics of the calculated autocorrelation function; and a deciding portion deciding that the chatter vibration occurs when a contact period at which the cutting edge contacts the workpiece is not an integral multiple of the period calculated by the calculating portion or when the frequency calculated by the calculating portion is not an integral multiple of a product of a number of cutting edges of the tool and rotational speed of the rotary spindle.

DETAILED DESCRIPTION OF THE INVENTION

Figure 1:
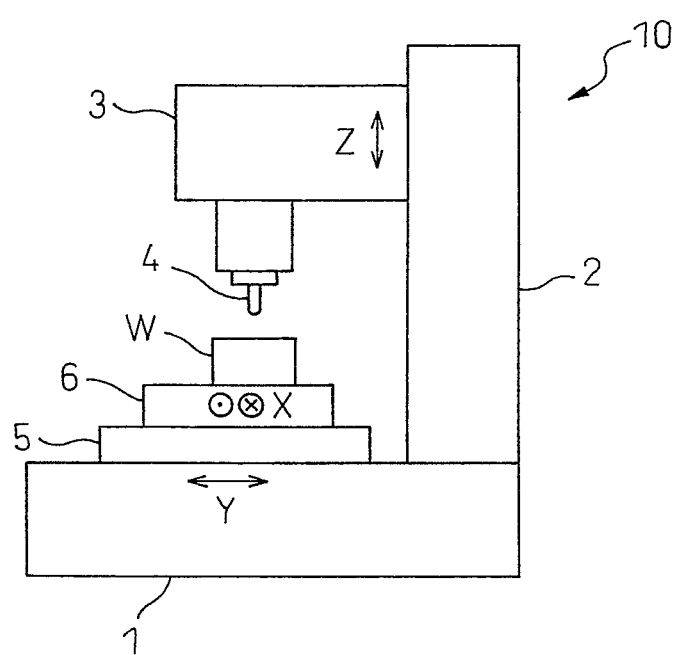
FIG. 1 is a view which shows the general configuration of a machine tool according to an embodiment of the present invention.

Below, referring to FIG. 1 to FIG. 8, embodiments of the present invention will be explained. FIG. 1 is a view which shows a general configuration of a machine tool 10 according to an embodiment of the present invention and shows a vertical machining center as an example.

A column 2 is erected on a bed 1. At the column 2, a spindle head 3 is supported elevatably in the up-down direction (Z-axis direction) through a linear feed mechanism. At the spindle head 3, a cutting tool 4 is attached facing downward via the rotary spindle. The tool 4 is, for example, an end mill which has two cutting edges at symmetric positions in the circumferential direction (first cutting edge 4a and second cutting edge 4b) and is driven to rotate by a spindle motor inside of the spindle head 3. On the bed 1, a saddle 5 is supported movably in the horizontal direction (Y-axis direction) through a linear feed mechanism. On the saddle 5, a table 6 is supported movably in the horizontal direction (X-direction) perpendicular to the Y-direction through a linear feed mechanism. Each of the X-direction, Y-direction, and Z-direction linear feed mechanisms is, for example, comprised of a ball screw and a servo motor which drives rotation of the ball screw.

Due to the above configuration, the tool 4 is moved relative to the workpiece W in the X-, Y-, and Z-directions whereby the workpiece W is machined. Below, the spindle motor inside of the spindle head 3 will be called the "spindle motor", the motor which moves the spindle head 3 in the Z-direction will be called the "Z-axis motor", the motor which moves the saddle 5 in the Y-direction will be called the "Y-axis motor", and the motor which moves the table 6 in the X-direction will be called the "X-axis motor". These motors are controlled by a later explained control device 30 which is provided in the machine tool 10.

In such a machine tool 10, if increasing the amount of cutting of the workpiece W, chatter vibration occurs during the machining operation. Not only is the quality of the machined surface lowered, but also the durability of the rotary spindle or the tool 4 is liable to be detrimentally affected. Typical examples of chatter vibration are regenerative chatter vibration, which is one type of self-excited vibration which occurs between the tool 4 and workpiece W, and forced chatter vibration, where the machine tool 10 which has the tool 4 is the source of vibration. Among these, in particular the regenerative chatter vibration can be suppressed if the operating point, which is defined by the spindle rotational speed S and the cutting depth z, is present at the bottom side of the stability limit chart defined by the combination of the machine tool 10 and the tool.

Figure 2A:
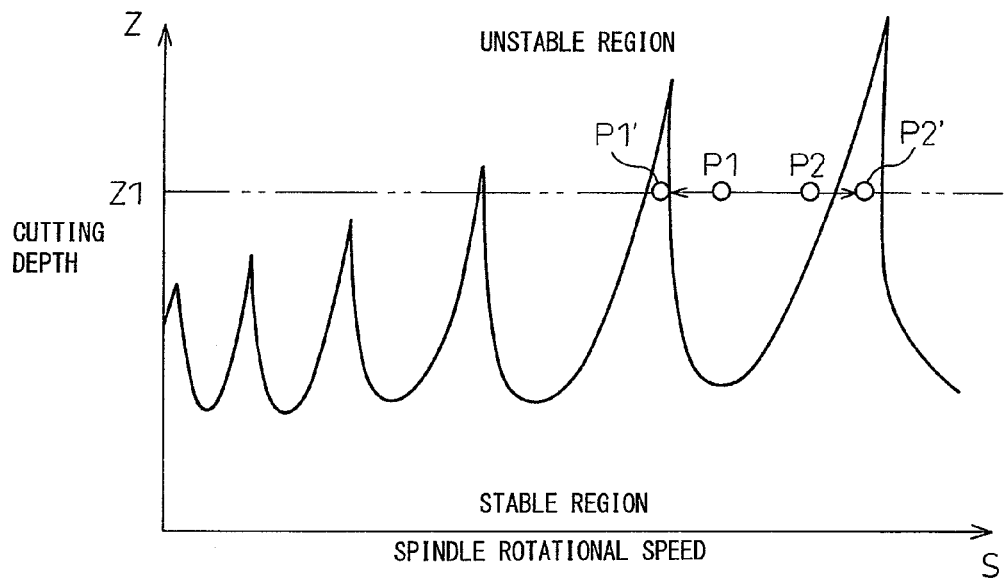
FIG. 2A is a view which shows an example of a stability limit chart.
Figure 2B:
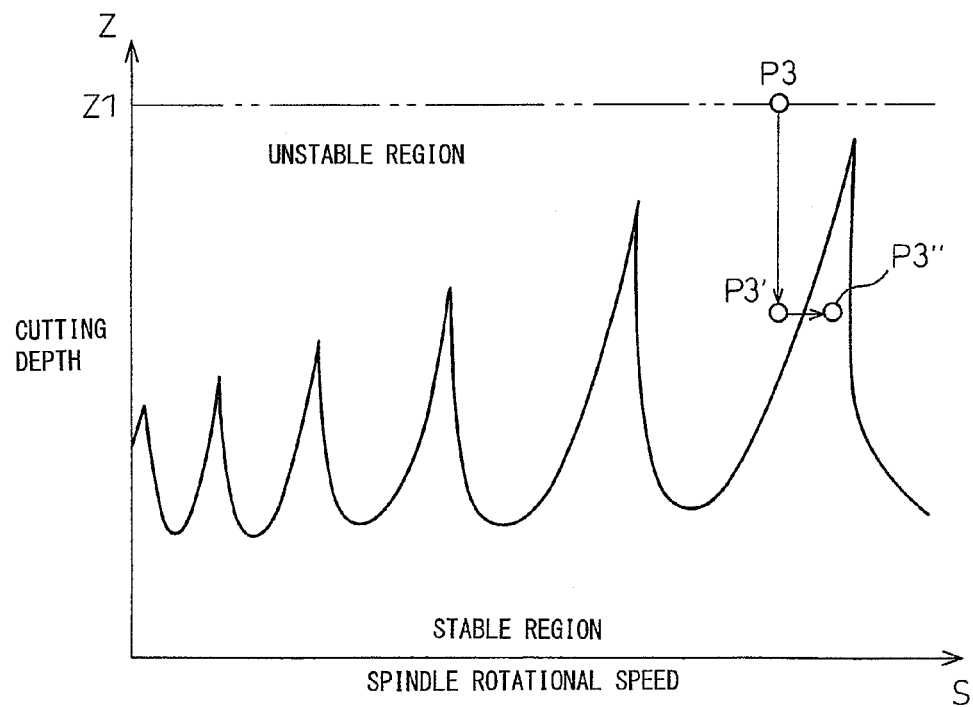
FIG. 2B is a view which shows an example of a stability limit chart.

FIG. 2A and FIG. 2B are views which show examples of stability limit charts. In the figures, the bottom sides of the stability limit charts are the stable regions and the top sides are the unstable regions. The stability limit charts have pluralities of peak regions (stable pockets) where the stable limit becomes partially higher as illustrated. Therefore, when the operating point is in the unstable region, if changing the spindle rotational speed S or cutting depth z and shifting the operating point to the inside of a stable pocket, it is possible to efficiently machine the workpiece W while suppressing the occurrence of chatter vibration. For example, when the operating point is P2 of FIG. 2A, if increasing the spindle rotational speed to shift the operating point to P2' while maintaining the cutting depth at the set value zl, it is possible to machine the workpiece W well without chatter vibration and without lowering the working efficiency.

In this regard, to detect the chatter vibration, there is the method of analyzing vibration data by FFT to calculate the chatter vibration frequency. However, with this method, a long sampling time is required for raising the frequency resolution. For example, when analyzing vibration at a spindle rotational speed of 30000 $min^{-1}$, if at least 60 $min^{-1}$ is necessary as the resolution of the spindle rotational speed, the frequency resolution becomes 1 Hz and 1 second of sampling time becomes necessary. For this reason, at least 1 second is taken to detect and avoid the chatter vibration. The machining operation during that period degrades the quality of the machined surface of the workpiece. To prevent this, it is necessary to shorten the sampling time and detect the chatter vibration as quickly as possible.

Figure 3:
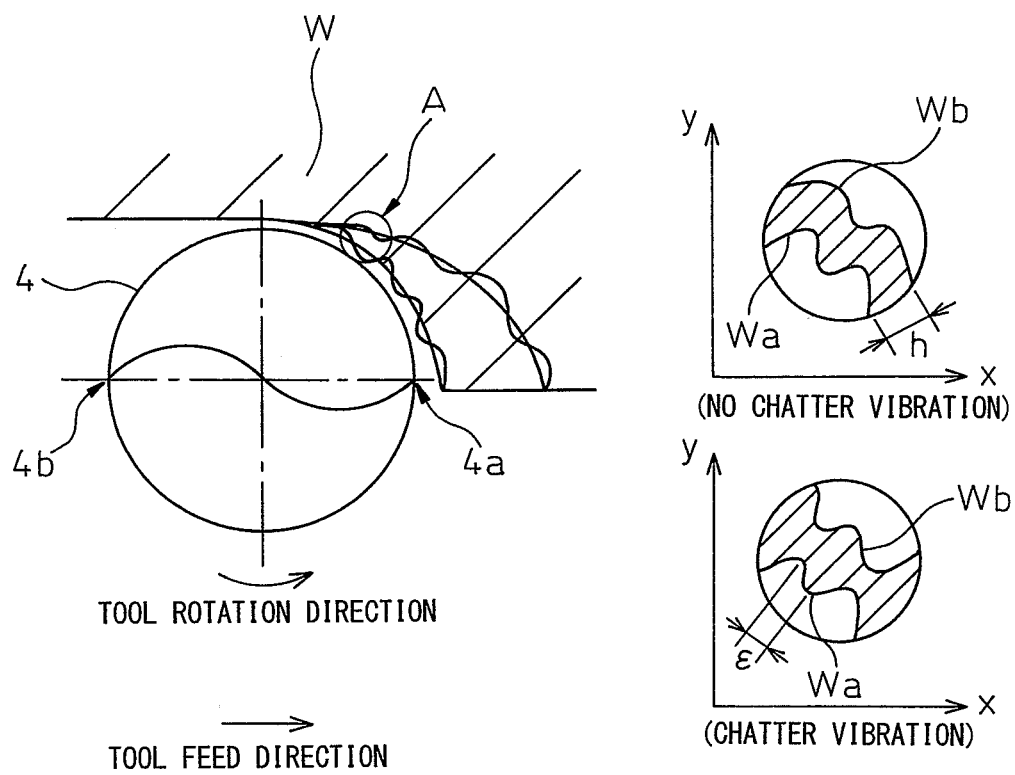
FIG. 3 is a view which schematically shows a machined surface of a workpiece during cutting.

Here, the mechanism of occurrence of chatter vibration will be explained. FIG. 3 is a view which schematically shows a machined surface of a workpiece during a cutting operation. At the right side of the figure, enlarged views of a part A for the case of no chatter vibration and the case of chatter vibration are shown. In the figure, Wa is the movement path of the first cutting edge 4a, Wb is the movement path of the second cutting edge 4b, and the thickness between Wa and Wb corresponds to the cutting thickness h which is cut by the second cutting edge 4b after being cut by the first cutting edge 4a.

The movement paths Wa and Wb of the cutting edges 4a and 4b fluctuate in a concavo-convex shape when viewed microscopically. For this reason, if there is no phase difference in the waveforms of the movement paths Wa and Wb, the cutting thickness h becomes constant. In this case, the cutting load becomes constant, so no chatter vibration occurs. As opposed to this, if there is a phase difference in the waveforms of the movement paths Wa and Wb, the cutting thickness h changes, so the cutting load fluctuates. Due to this, chatter vibration occurs. The phase difference can be determined if there is enough vibration data for the cutting edges to contact the machined surface of the workpiece four times. Considering this point, in the present embodiment, as explained below, a small number of data samples may be used to detect chatter vibration in a short time.

Figure 4:
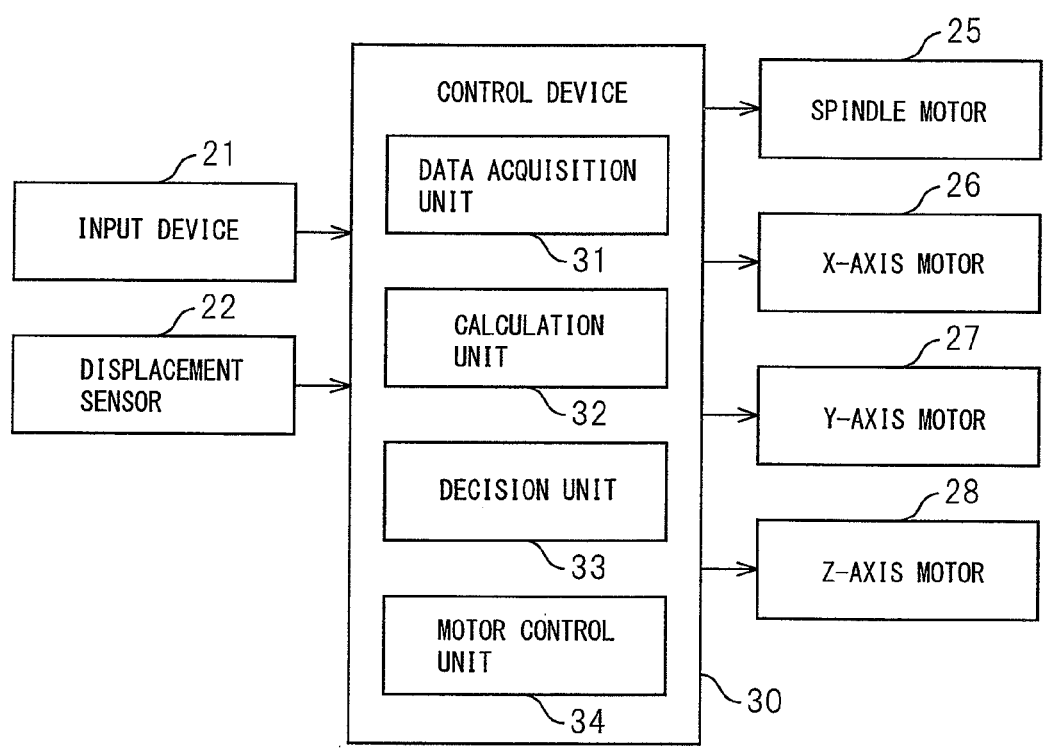
FIG. 4 is a block diagram which shows a control configuration of a machine tool of FIG. 1.

FIG. 4 is a block diagram which shows a control configuration of a machine tool 10 for carrying out the chatter vibration detection method and chatter vibration avoidance method according to the present embodiment. To the control device 30, an input device 21, which inputs various types of information relating to machining of the workpiece, and a displacement sensor 22, which detects axial displacement in the radial direction of the spindle, are connected. The control device 30 reads the signals from these input device 21 and displacement sensor 22, runs a preset predetermined machining program, and controls the spindle motor 25, X-axis motor 26, Y-axis motor 27, and Z-axis motor 28 which are provided at the machine tool 10.

The input device 21 is configured by an operating panel, keyboard, etc. Through the input device 21, a set value z1 of the cutting depth, a set value S1 of the spindle rotational speed S, a data sampling period, and a start command of machining the workpiece W, etc. are input. The displacement sensor 22 is for example configured by two eddy current type displacement sensors which detect X-direction axial displacement dx and Y-direction axial displacement dy of the spindle.

Figure 5A:
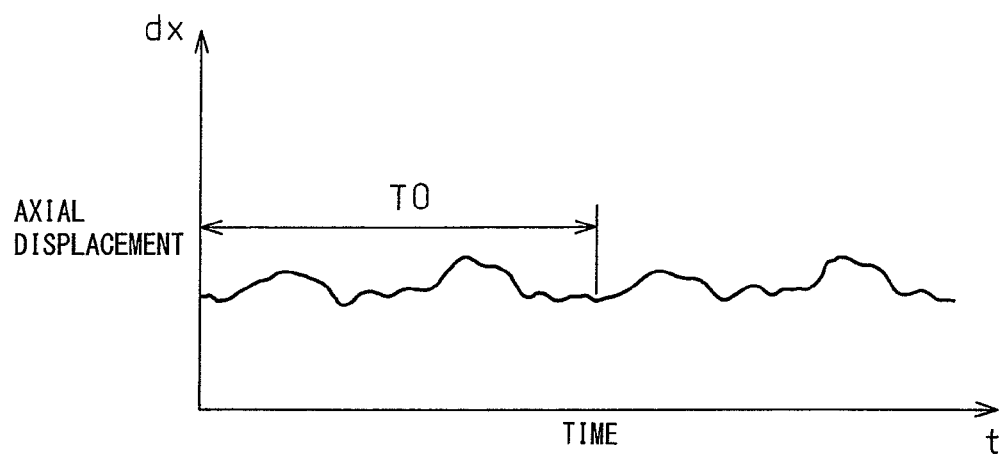
FIG. 5A is a view which shows an example of a waveform of vibration data in the case where chatter vibration does not occur.
Figure 5B:
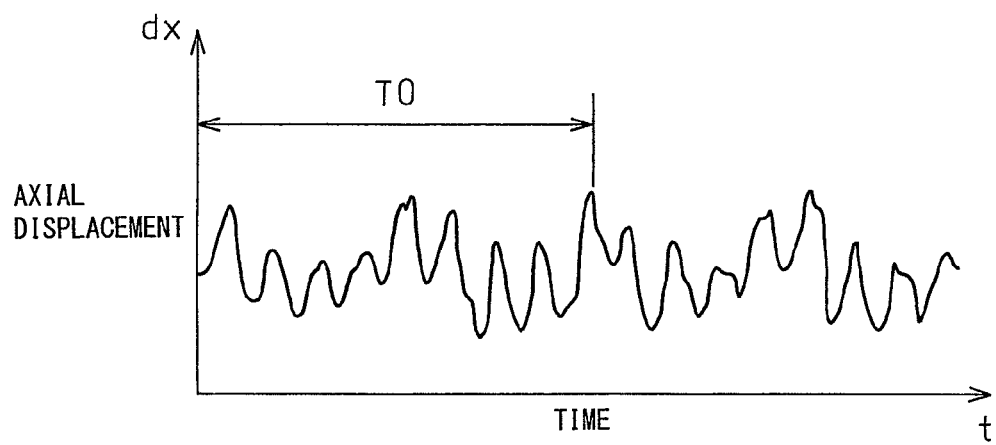
FIG. 5B is a view which shows an example of a waveform of vibration data in the case where chatter vibration occurs.

FIG. 5A and FIG. 5B show examples of the X-direction axial displacement dx which is obtained by the displacement sensor 22 when the tool 4 is moved relative to the workpiece W in the X-direction and show characteristics of time series vibration data. In particular, FIG. 5A shows the waveform of the vibration data in the case where chatter vibration does not occur, while FIG. 5B shows the waveform of the vibration data in the case where chatter vibration occurs. In the figure, T0 is the rotational period of the spindle. Vibration data in T0 corresponds to the vibration data obtained when the first cutting edge 4a and the second cutting edge 4a contact the workpiece W one time, respectively.

Figure 6:
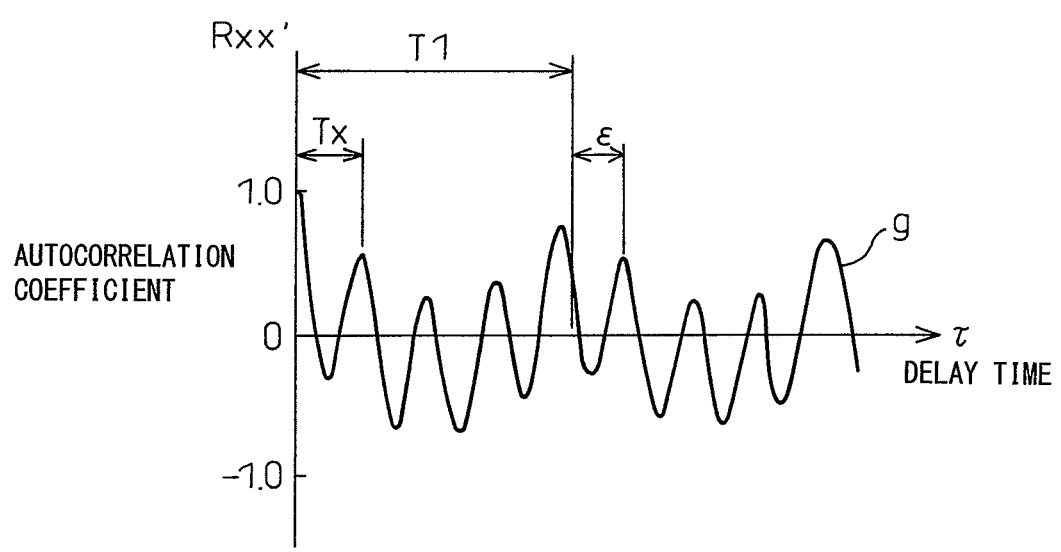
FIG. 6 is a view which shows an autocorrelation coefficient which is obtained from vibration data of FIG. 5B.

The vibration data shown in FIG. 5A and FIG. 5B fluctuate periodically in accordance with the movement paths Wa and Wb of FIG. 3. The periodicity of this vibration data can be evaluated by using an autocorrelation function and calculating the correlation value (autocorrelation function Rxx) between the current vibration data and the vibration data shifted from this vibration data by the delay time τ. FIG. 6 is a view which shows the characteristics of the autocorrelation function Rxx determined from the vibration data of FIG. 5B. In the figure, to facilitate handling of data, the autocorrelation function Rxx is averaged and dispersed using the standard deviation to convert it to the autocorrelation coefficient Rxx' so that all data is included between −1 and +1.

The autocorrelation coefficient Rxx' is 1 when the delay time τ is 0. It repeatedly increases and decreases along with increase of the delay time τ and forms a waveform of the period Tx which has local maximal values and local minimal values (below, this is referred to as "autocorrelation waveform g"). In the figure, T1 is the reciprocal (1/C·S) of the product of the spindle rotational speed S and number of cutting edges C (here, 2) of the tool, that is, the period T1 (=T0/C) where the cutting edges contact the workpiece W. Here, assuming the local maximal values of the autocorrelation waveform g match the contact period T1, forced vibration occurs due to contact of the cutting edges with the workpiece W, and regenerative chatter vibration does not occur.

As opposed to this, if a difference (phase difference ε) arises between the local maximal values of the autocorrelation waveform g and the contact period T1 as illustrated, the cutting thickness h becomes uneven and chatter vibration occurs. In this case, as shown in FIG. 2A, if the cutting depth z is less than the local maximal value of a stable pocket, the phase difference ε may be made to become 0 by adjusting the spindle rotational speed S to thereby suppress the occurrence of chatter vibration. Considering the above points, in the present embodiment, the control device 30 of FIG. 4 is configured.

The control device 30 is configured including a processing system which has a CPU, ROM, RAM, and other circuits, etc. As functional components, it has a data acquisition unit 31, a calculation unit 32, a decision unit 33, and a motor control unit 34. The data acquisition unit 31 acquires vibration data from the displacement sensor 22 at a predetermined sampling period. The calculation unit 32 calculates the autocorrelation coefficient Rxx' from the time series vibration data acquired at the data acquisition unit 31 and calculates the period Tx of that autocorrelation waveform g. The decision unit 33 uses the period Tx calculated at the calculation unit 32 to calculate the phase difference ε and decides whether chatter vibration occurs or not, based on that phase difference ε. The motor control unit 34 controls the spindle motor 25 and X-axis motor 26 so that the phase difference ε becomes 0 when the decision unit 33 decides that chatter vibration has occurred.

Figure 7:
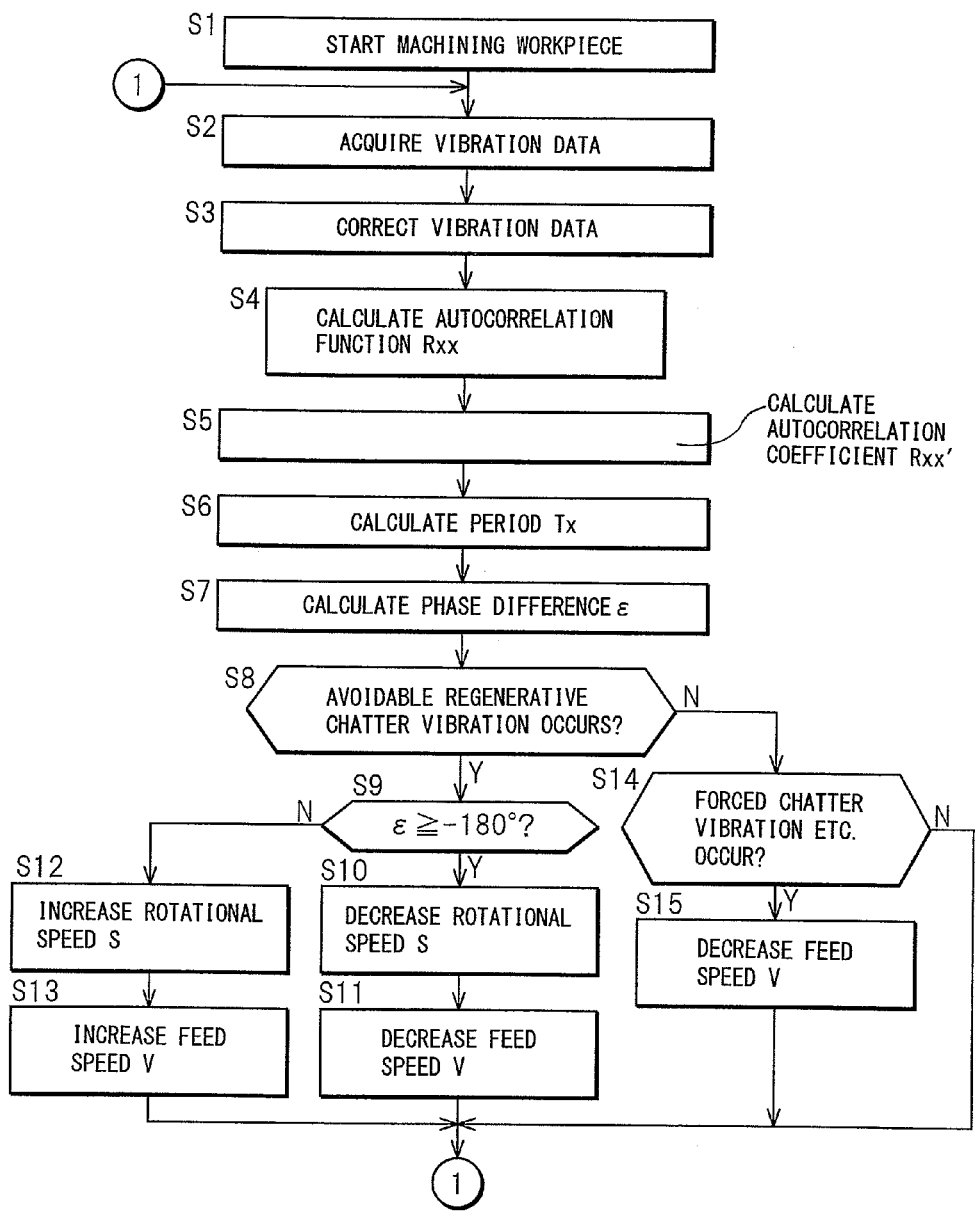
FIG. 7 is a block diagram which shows one example of the processing which is carried out at a control device of FIG. 4.

Below, the specific processing in the control device 30 will be explained. FIG. 7 is a flowchart which shows an example of the processing executed at the control device 30. The processing shown in this flowchart is started, for example, by input of a start command of machining a workpiece W from the input device 21. The control device 30 is set in advance with a set value S1 of a spindle rotational speed, set value z1 of the cutting depth, sampling period Δt, and number of data samples N, etc. N is the number of data samples required for decision of chatter vibration. A number of samples of an amount for the cutting edges to contact with the workpiece W four times is necessary. If, like in the present embodiment, the number of tool cutting edges C is two, vibration data of two revolutions of the spindle is sufficient. The control device 30 stores vibration data at the time of no-load operation of the spindle measured in advance.

At step S1, control signals are output to the motors 25 to 29 to start machining of the workpiece under preset conditions. That is, the spindle is made to rotate by the set rotational speed S1 and the tool 4 is made to move relatively from a machining start position of a set cutting depth z1 in the X-direction at a feed speed V set by the machining program.

At step S2, the signal from the displacement sensor 22 is read and the vibration data is acquired at the predetermined sampling period Δt. At step S3, vibration data at the time of no-load rotation of the spindle stored in advance is subtracted from this vibration data so as to correct the vibration data. By carrying out this correction, vibration components due to shaking of the spindle are cancelled and the reliability of the subsequent processing results is improved.

At step S4, the autocorrelation function is used to calculate the autocorrelation function Rxx for the corrected current vibration data by the following equation (I).

$$Rxx(m) = \frac{1}{N}\sum_{n=0}^{N-1} x(n)x(n+m) \tag{I}$$

The above equation (I) is an equation which expresses the autocorrelation function as a discrete function. "m" means the shift time when processing the autocorrelation function and corresponds to the delay time τ of the continuous function (FIG. 6).

At step S5, the autocorrelation function Rxx is averaged and dispersed by the following equation (II) using the standard deviation to convert Rxx to the autocorrelation coefficient Rxx'.

$$Rxx'(m) = \frac{\frac{1}{N}\sum_{n=0}^{N-1} x'(n)x'(n+m)}{\sqrt{\frac{1}{N}\sum_{n=0}^{N-1} x'(n)^2}\sqrt{\frac{1}{N}\sum_{n=0}^{N-1} x'(n+m)^2}} \tag{II}$$

$$= \frac{\sum_{n=0}^{N-1} x'(n)x'(n+m)}{\sqrt{\sum_{n=0}^{N-1} x'(n)^2}\sqrt{\sum_{n=0}^{N-1} x'(n+m)^2}}$$

where, $x'(n) = x(n) - \frac{1}{N}\sum_{n=0}^{N-1} x(n)$

At step S6, the period Tx of the autocorrelation waveform g of the autocorrelation coefficient Rxx' is calculated. In this case, it is sufficient to extract the peak points (peak maximum values) where the autocorrelation coefficient Rxx' is more than or equal to a predetermined value Ra (for example, 0.5) and calculate the time interval from the start point where Rxx'=1 (FIG. 6) or the time interval between peak points. Note that, the predetermined value Ra is determined in advance by experiments and so on, and may be made 0.6 or 0.7.

At step S7, the following equation (III) is used to calculate the phase difference ε (FIG. 6) between the contact period T1 and the period Tx.

$$\varepsilon = 360 \cdot (1/(C \cdot S \cdot Tx) - \text{int}(1/(C \cdot S \cdot Tx)) - 1) \tag{III}$$

That is, the contact period T1 (=1/C·S) is divided by the period Tx. From that value (1/(C·S·Tx)), the integer part is subtracted and further 1 is subtracted. The result is multiplied with 360. Here, the calculated phase difference ϵ always becomes a minus angle (deg).

At step S8, based on the phase difference ϵ, it is decided whether chatter vibration which can be avoided by adjustment of the spindle rotational speed after step S9 on has occurred. That is, it is decided whether the phase difference ϵ is substantially 0° or substantially −360°. More specifically, when ϵ is less than or equal to a predetermined value ϵ0 (for example, −5°) or more than or equal to a predetermined value ϵ1 (for example, −355°), it is decided that regenerative chatter vibration has occurred and the routine proceeds to step S9. The value of ϵ0 or ϵ1 is suitably determined by experiments.

At step S9, it is decided whether the phase difference ϵ is more than or equal to −180°. If a positive decision is made at step S9, the routine proceeds to step S10, while if a negative decision is made, the routine proceeds to step S12.

At step S10, a control signal is output to the spindle motor 25 to decrease the spindle rotational speed S. Due to this, the contact period T1 is increased and the phase difference ϵ approaches 0°. In this case, it is preferable to change the amount of decrease of the rotational speed S in accordance with the phase difference ϵ. For example, when the phase difference ϵ is more than or equal to −180° and less than −150°, the speed is decreased by 5% of the set rotational speed, while when the phase difference ϵ is more than or equal to −150° and less than −5°, the speed is decreased by 3% of the set rotational speed. The rate of change of the spindle rotational speed is changed in accordance with the magnitude of the phase difference ϵ in this way so as to quickly make the spindle rotational speed converge to a speed where chatter vibration can be avoided.

At step S11, a control signal is output to the X-axis motor 26 and the feed per one cutting edge is made to become constant before and after the decrease in the rotational speed S by decreasing the feed speed V as well along with the decrease of the rotational speed S. When the processing at step S11 ends, the routine returns to step S2 where similar processing is repeated.

On the other hand, at step S12, a control signal is output to the spindle motor 25 to increase the spindle rotational speed S. Due to this, the contact period T1 is decreased and the phase difference ϵ approaches −360°. In this case, the amount of increase of the rotational speed S is preferably changed in accordance with the phase difference ϵ. For example, when the phase difference ϵ is more than or equal to −210° and less than −180°, the speed is increased by 5% of the set rotational speed S1, while when the phase difference ϵ is more than or equal to −355° and less than −210°, the speed is increased by 3% of the set rotational speed.

At step S13, a control signal is output to the X-axis motor 26 and the feed per one cutting edge is made to become constant before and after the increase in the rotational speed S by increasing the feed speed V as well along with the increase of the rotational speed S. When the processing of step S13 ends, the routine returns to step S3 where similar processing is repeated.

If it is decided at step S8 that regenerative chatter vibration which can be avoided by increasing and decreasing the spindle rotational speed has not occurred, the routine proceeds to step S14. At step S14, it is decided whether forced chatter vibration or regenerative chatter vibration which cannot be avoided by increasing and decreasing of the spindle rotational speed has occurred. For example, if the displacement detected by the displacement sensor 22 exceeds a predetermined value, it is decided that forced chatter vibration or regenerative chatter vibration which cannot be avoided by increasing and decreasing of the spindle rotational speed has occurred. If a positive decision is made at step S14, the routine proceeds to step S15, while if a negative decision is made, it returns to step S2.

At step S15, a control signal is output to the X-axis motor 26 to decelerate only the feed speed V by a predetermined amount while maintaining the rotational speed S. Due to this, the cutting load is decreased, that is, the exciting force is decreased, to avoid forced chatter vibration or to avoid regenerative chatter vibration which cannot be avoided by increasing and decreasing of the spindle rotational speed. When the processing of step S15 ends, the routine returns to step S2 where similar processing is repeated.

The above operations at the control device 30 can be summarized as follows: First, a signal from the displacement sensor 22 at the time of machining the workpiece is acquired at a predetermined sampling period Δt (step S2). Next, the acquired time series vibration data is corrected by the vibration data at the time of no-load rotation of the spindle (step S3). Based on the corrected vibration data, the autocorrelation function Rxx corresponding to the time T0 required for the cutting edges to contact the workpiece W four times is calculated (step S4). That is, to evaluate the periodicity of the vibration data, vibration data of the number of samples N is used to calculate the autocorrelation function Rxx with respect to the current vibration data.

Furthermore, to facilitate handling of the autocorrelation function Rxx, the autocorrelation function Rxx is averaged and dispersed to convert Rxx to the autocorrelation coefficient Rxx' so that all data is included between −1 to +1 (step S5), then the period Tx of the characteristic (autocorrelation waveform g of FIG. 6) of this autocorrelation coefficient Rxx' is calculated (step S6). Next, the phase difference s of the contact period T1 of the cutting edge and the period Tx is calculated in the range of −360° to 0° (step S7).

When the phase difference ϵ is substantially 0° or substantially −360°, it is decided that regenerative chatter vibration has not occurred or regenerative chatter vibration which cannot be avoided by increasing and decreasing of the spindle rotational speed has occurred. As opposed to this, when the phase difference ϵ is different from 0° and −360° by, for example, more than or equal to 5°, it is decided that regenerative chatter vibration which can be avoided by increasing and decreasing of the spindle rotational speed has occurred. In this case, when the phase difference ϵ is more than or equal to −180°, the spindle rotational speed S is decreased. Due to this, as shown in FIG. 2A, the operating point P1 moves to P1' (step S10). When the phase difference ϵ is smaller than −180°, the rotational speed S of the spindle is increased. Due to this, as shown in FIG. 2A, the operating point P2 moves to P2' (step S12). By increasing and decreasing the rotational speed S of the spindle in this way, the operating point moves to the stable region in the stability limit chart, so chatter vibration can be suppressed and a stable workpiece machining operation can be realized. At this time, the feed speed V is decreased or increased along with the change of the rotational speed of the spindle so that the feed per one cutting edge becomes constant (step S11 and step S13). Due to this, the cutting load becomes constant, so a machining operation preferable for the quality of the finished surface of the workpiece W and for the tool 4 becomes possible.

On the other hand, if the set value z1 of the cutting depth is too large, for example, when the operating point is P3 of FIG. 2B, it is considered that regenerative chatter vibration which cannot be avoided by increasing and decreasing of the spindle rotational speed or forced chatter vibration has occurred, and the feed speed V is decreased without changing the spindle rotational speed S (step S15). Due to this, the load on the tool 4 is decreased, so there is a similar effect as if reducing the cutting depth z and the operating point P3 moves to P3'. After that, the spindle rotational speed S increases (step S12) and the operating point P3' moves to P3". Due to this, the workpiece W can be machined while suppressing chatter vibration in the stable region.

According to the present embodiment, the following such functions and effects can be exhibited.

(1) The control device 30 acquires the vibration data at the time of machining a workpiece at a predetermined sampling period (data acquiring step), calculates the autocorrelation coefficient Rxx' corresponding to the time required for the cutting edges to contact the workpiece W a plurality of times based on this acquired time series vibration data and calculates the period Tx of the characteristic of the autocorrelation coefficient Rxx' (calculating step), and decides that regenerative chatter vibration which can be avoided by increasing and decreasing of the spindle rotational speed occurs when the contact period T1 when the cutting edges contact the workpiece W is not an integral multiple of the period Tx (deciding step). Due to this, a small number of data samples N can be used for decision of chatter vibration and chatter vibration can be detected immediately after the occurrence of chatter vibration. In this case, the "integral multiple" in the deciding step is not made a "integral multiple" in the strict sense, but is made the "integral multiple" when the phase difference $\epsilon$ is substantially 0° or substantially −360° (for example, when in range of ±5°), so the control becomes stable. For example, in the case of a spindle rotational speed of 30000 $\min^{-1}$, number of tool cutting edges of 2, and sampling period of 0.1 msec, the time required for the cutting edges to contact the workpiece W four times (time for rotary spindle to rotate 2 times) is 4 msec and the number of data samples during that time is 40. If the processing time for calculating the autocorrelation coefficient Rxx', deciding the chatter vibration, calculating the increasing and decreasing of the spindle rotational speed to avoid chatter vibration, etc. is considered negligible, chatter vibration can be detected and the routine for avoiding it can be started in substantially real time (4 msec). Compared with the conventional Fourier analysis system, chatter vibration can be quickly avoided.

(2) When the control device 30 decides the occurrence of chatter vibration, the phase difference s is made to become 0, that is, the contact period T1 is made to become an integral multiple of the period Tx according to the autocorrelation coefficient, by increasing and decreasing the spindle rotational speed S (rotational speed adjusting step). This adjustment of the spindle rotational speed may be carried out by the method of repeating the operation of increasing and decreasing by a predetermined ratio in accordance with the calculated phase difference until the phase difference becomes substantially 0. Therefore, it is possible to immediately avoid chatter vibration even without determining the mechanical stability limit chart in advance and possible to suppress the decrease in quality of the machined surface of the workpiece.

(3) Rxx is converted to Rxx' so that the autocorrelation coefficient Rxx is included in the range from −1 to 1, so the characteristic of the autocorrelation coefficient Rxx' can be easily grasped and the period Tx can be precisely calculated.

(4) When increasing and decreasing the spindle rotational speed S, the feed per one cutting edge is made to become constant by changing the feed speed V of the tool 4 in accordance with the increasing and decreasing in the rotational speed S, so the cutting load can be made constant and the quality of the finished surface of the workpiece W and the lifetime of the tool 4 can be improved.

(5) The vibration data acquired by the displacement sensor 22 is corrected by the vibration data at the time of no load rotation of the spindle, so the occurrence of regenerative chatter vibration can be precisely decided.

In the above embodiment, although the equation (III) is used to calculate the phase difference $\epsilon$, instead of that, the following equation (IV) may also be used to calculate the phase difference $\epsilon$.

$$\epsilon = 360 \cdot (\delta/Tx - 1) \tag{IV}$$

Figure 8:
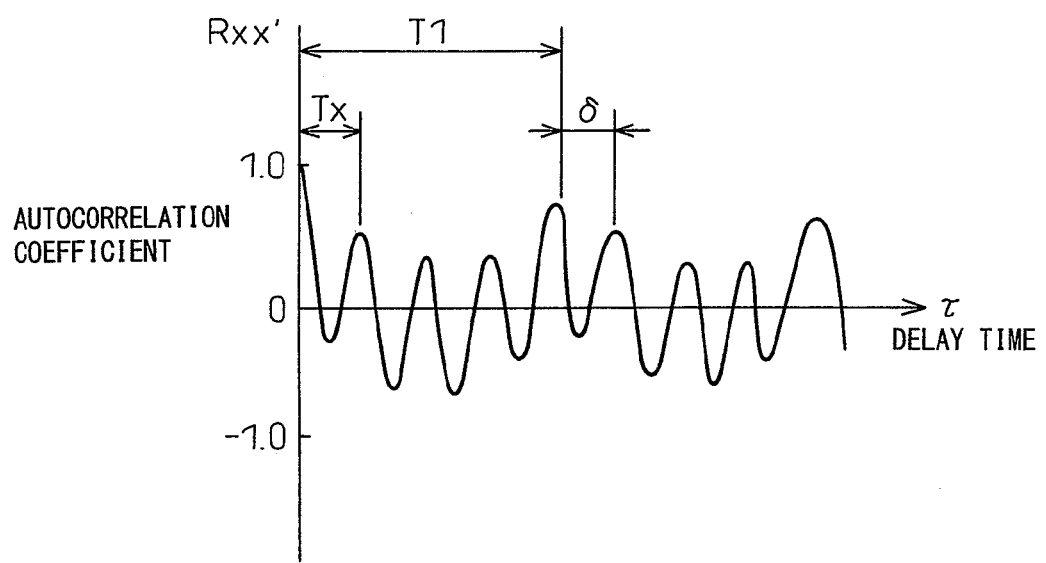
FIG. 8 is a view which explains another method of calculation of a phase difference.

Here, as shown in FIG. 8, $\delta$ corresponds to the delay time of the peak point of the autocorrelation coefficient Rxx' for the contact period T1 in the characteristic of the autocorrelation coefficient Rxx'.

In the above embodiment, although vibration from the displacement sensor 22 at the time of machining a workpiece is read by the data acquisition unit 31 to acquire the vibration data, any data acquiring portion may be used so long as able to acquire vibration data having a correlation with the vibration of the tool 4 at a predetermined sampling period $\Delta t$. For example, it is possible to detect the spindle vibration acceleration or cutting load or to detect the machining noise and use that detected value as vibration data. The calculation unit 32 calculates the time series autocorrelation function Rxx of vibration data, converts this autocorrelation function Rxx by a predetermined conversion equation (II), and calculates the period Tx of the autocorrelation waveform g of the converted autocorrelation coefficient Rxx'. However, it is also possible to calculate the period Tx without using the conversion equation (II). Therefore, the configuration of a calculating portion is not limited to the one explained above.

The decision unit 33 decides the occurrence of chatter vibration when the contact period T1 at the time that the cutting edges contact the workpiece W is not an integral multiple of the period Tx determined by the autocorrelation coefficient Rxx'. However, the configuration of a deciding portion is not limited to this. For example, it is also possible to use the calculation unit 32 to calculate the frequency $\epsilon$ of the autocorrelation coefficient Rxx' and use the decision unit 33 to decide the occurrence of chatter vibration when the frequency f is not a integral multiple of the product of the number of tool cutting edges C and the spindle rotational speed S. When the occurrence of chatter vibration has been decided, the motor control unit 34 outputs a control signal to the spindle motor 25 whereby the contact period T1 is made to become an integral multiple of the period Tx by adjustment of the spindle rotational speed S. However, the frequency f of the autocorrelation coefficient Rxx' may also be made to become an integral multiple of the product of the number of tool cutting edges C and the spindle rotational speed S by adjustment of the spindle rotational speed S. Therefore, the configuration of a rotational speed adjusting portion is not limited to the above one.

Above, a vertical machining center is used as a machine tool 10 to realize a chatter vibration detection method and a chatter vibration avoidance method. However, a horizontal type machining center or other machine tool may also be used to realize the chatter vibration detection method and chatter vibration avoidance method according to the present invention.

According to the present invention, the autocorrelation function of vibration data is used to decide the occurrence of chatter vibration, so it becomes possible to immediately detect and avoid the occurrence of chatter vibration during a machining operation. Due to this, the quality of the finished surface of the workpiece is improved, and further, wear of the rotary spindle and tool of the machine tool can be prevented.

The invention claimed is:

1. A regenerative chatter vibration detection method for detecting regenerative chatter vibration, the regenerative chatter vibration occurring when a tool having a cutting edge is attached to a rotary spindle and this tool is moved relative to a workpiece to machine the workpiece, comprising:
   a data acquiring step of acquiring vibration data, which has a correlation with vibration of the tool at a time of machining the workpiece, at a predetermined sampling period;
   a calculating step of calculating an autocorrelation function corresponding to a time required for the rotary spindle to rotate at least twice so that the cutting edge contacts the workpiece several times based on time series vibration data acquired by the data acquiring step, and calculating a period or frequency of characteristics of the calculated autocorrelation function; and
   a deciding step of deciding that the regenerative chatter vibration occurs when a contact period at which the cutting edge contacts the workpiece is not an integral multiple of the period calculated by the calculating step or when the frequency calculated by the calculating step is not an integral multiple of a product of a number of cutting edges of the tool and a rotational speed of the rotary spindle.

2. A regenerative chatter vibration avoidance method for avoiding regenerative chatter vibration, the regenerative chatter vibration occurring when a tool having a cutting edge is attached to a rotary spindle and this tool is moved relative to a workpiece to machine the workpiece, comprising:
   a data acquiring step of acquiring vibration data, which has a correlation with vibration of the tool at a time of machining the workpiece, at a predetermined sampling period;
   a calculating step calculating an autocorrelation function corresponding to a time required for the rotary spindle to rotate at least twice so that the cutting edge contacts the workpiece several times base on time series vibration data acquired by the data acquiring step, and calculating a period or frequency of characteristics of the calculated autocorrelation function;
   a deciding step of deciding that the regenerative chatter vibration occurs when a contact period at which the cutting edge contacts the workpiece is not an integral multiple of the period calculated by the calculating step or when the frequency calculated by the calculating step is not an integral multiple of a product of a number of cutting edges of the tool and a rotational speed of the rotary spindle; and
   a rotational speed adjusting step of calculating a phase difference determined from the contact period of the cutting edge and the period calculated by the calculating step or a phase difference determined from the product of the number of cutting edges of the tool and the rotational speed of the rotary spindle and the frequency calculated by the calculating step when the deciding step decides that the regenerative chatter vibration occurs, increasing and decreasing the rotational speed of the rotary spindle by a predetermined ratio based on the calculated phase difference, and repeating the increasing and decreasing of the rotational speed of the rotary spindle until the calculated phase difference becomes substantially 0.

3. The regenerative chatter vibration avoidance method according to claim 2, wherein the calculating step includes converting the autocorrelation function to an autocorrelation coefficient by using standard deviation and calculating a period or frequency of characteristics of the converted autocorrelation coefficient.

4. The regenerative chatter vibration avoidance method according to claim 2, wherein the rotational speed adjusting step includes increasing and decreasing a feed speed of the tool in accordance with the increasing and decreasing of the rotational speed of the rotary spindle to make an amount of a feed per one cutting edge constant.

5. The regenerative chatter vibration avoidance method according to claim 2, comprising, lowering a feed speed of the tool when the vibration data exceeds a predetermined value despite the phase difference calculated by the rotational speed adjusting step becoming substantially 0.

6. The regenerative chatter vibration avoidance method according to claim 2, wherein the calculating step includes subtracting vibration data at a time of no-load rotation of the rotary spindle stored in advance from the vibration data acquired by the data acquiring step so as to correct the vibration data and deriving the characteristics of the autocorrelation function based on this corrected vibration data.

7. A machine tool for machining a workpiece, in which a tool having a cutting edge is attached to a rotary spindle, and this tool is moved relative to the workpiece, comprising:
   a data acquiring portion acquiring vibration data, which has a correlation with vibration of the tool at a time of machining the workpiece, at a predetermined sampling period;
   a calculating portion calculating an autocorrelation function corresponding to a time required for the rotary spindle to rotate at least twice so that the cutting edge contacts the workpiece several times based on time series vibration data acquired by the data acquiring portion, and calculating a period or frequency of characteristics of the calculated autocorrelation function; and
   a deciding portion deciding that the regenerative chatter vibration occurs when a contact period at which the cutting edge contacts the workpiece is not an integral multiple of the period calculated by the calculating portion or when the frequency calculated by the calculating portion is not an integral multiple of a product of a number of cutting edges of the tool and rotational speed of the rotary spindle.

8. The machine tool according to claim 7, further comprising, a rotational speed adjusting portion calculating a phase difference determined from the contact period of the cutting edge and the period calculated by the calculating portion or a phase difference determined from the product of the number of cutting edges of the tool and the rotational speed of the rotary spindle and the frequency calculated by the calculating portion when the deciding portion decides that the regenerative chatter vibration occurs, increasing and decreasing the rotational speed of the rotary spindle by a predetermined ratio based on the calculated phase difference, and repeating the increasing and decreasing of the rotational speed of the rotary spindle until the calculated phase difference becomes substantially 0.

* * * * *